(12) United States Patent
Imai

(10) Patent No.: US 6,369,785 B1
(45) Date of Patent: *Apr. 9, 2002

(54) ORGANIC ELECTROLUMINESCENCE DISPLAY APPARATUS

(75) Inventor: Kunio Imai, Tsurugashima (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/895,799

(22) Filed: Jul. 17, 1997

(30) Foreign Application Priority Data

Aug. 26, 1996 (JP) .............................. 8-242665

(51) Int. Cl.[7] ................................. G09G 5/00
(52) U.S. Cl. ....................................... 345/76
(58) Field of Search ............................ 345/76, 77, 80, 345/82

(56) References Cited

U.S. PATENT DOCUMENTS

| 4,720,432 A | * | 1/1988 | VanSlyke et al. | 428/457 |
| 5,243,332 A | * | 9/1993 | Jacobson | 345/44 |
| 5,688,551 A | * | 11/1997 | Littman et al. | 427/64 |
| 5,838,308 A | * | 11/1998 | Knapp et al. | 345/173 |
| 5,900,327 A | * | 7/1999 | Wei et al. | 345/156 |

* cited by examiner

Primary Examiner—Almis R. Jankus
(74) Attorney, Agent, or Firm—Perman & Green, LLP

(57) ABSTRACT

A light emitting display apparatus comprising organic electroluminescence elements which have photosensitive reading function is disclosed. An organic electroluminescence display apparatus comprises a plurality of organic electroluminescence elements arranged on a plane, driving means for driving said plurality of organic electroluminescence elements on the basis of an input signal to emit light from the organic electroluminescence element, light input means for irradiating the organic electroluminescence element with light, and reading means for reading out a voltage generated over the organic electroluminescence element in response to a light input from said irradiating means.

6 Claims, 7 Drawing Sheets

ORGANIC ELECTROLUMINESCENCE DISPLAY APPARATUS

BACKGROUND OF THE INVENTION

1. Field of the Invention

This invention relates to a display panel comprising organic electroluminescence elements (designated as organic EL elements hereinafter).

2. Discussion of Related Art

An organic EL element is well-known which comprises a substrate consisting of a glass plate or a transparent organic film and a fluorescent layer formed on the substrate, wherein a current passing through the fluorescent layer causes the fluorescent layer to emit a light.

FIG. 1 shows a schematic diagram showing one embodiment of the above organic EL element. Referring to FIG. 1, an organic EL element includes a glass substrate 1, a transparent electrode 2 formed on an upper surface of the glass substrate 1 and a light emitting layer 3 formed on an upper surface of the transparent electrode 2. The organic EL element further includes a metal electrode formed on an upper surface of the light emitting layer 3.

FIG. 2 shows an electric equivalent circuit representative of the organic EL element. As shown in FIG. 2, the organic EL element is generally considered to be a capacitive light emitting device which equivalently includes a circuit resistance component R, a capacitive component C, and a light emitting component D.

Accordingly, when a driving voltage for the light emission is applied to the organic EL element, a flow of electric charge corresponding to the electric capacitance of the element is passed into the electrode as a displacement current to store therein. It is considered that if a potential induced in the electrode then exceeds a predetermined voltage (barrier voltage), a current flow begins to flow into the organic layer, so that emission from the organic layer starts proportionally to the quantities of the current flow.

FIG. 3 shows one embodiment of a display device including a plurality of organic EL elements. As shown in FIG. 3, such a device comprises a cathode-line scanning circuit 51, an anode-line driver circuit 52, and a display panel (not shown). The cathode-line scanning circuit 51 is connected to the display panel through a plurality of connecting terminals $b_1$–$b_n$ which consist of connecting sections. Similarly, the anode-line driver circuit 52 is connected to the display panel through a plurality of connecting terminals $a_1$–$a_m$ which consist of connecting sections.

A method for driving the display panel with the circuit shown in FIG. 3 is called a simple matrix driving method, which comprises the steps of;

placing anode-lines $A_1$–$A_m$ and cathode-lines $B_1$–$B_n$ in a matrix (lattice) arrangement, connecting a cross point of the anode-line and the cathode-line in the matrix arrangement to the corresponding one of the light emitting elements $E_{1,1}$–$E_{m,n}$, selecting either of the anode and cathode lines to scan each of the selected ones in order at regular time intervals, and driving the other lines with current sources $52_1$–$52_m$ as power supplies in synchronization with the above scanning, whereby any light emitting elements on the corresponding cross points can emit a light.

There are two types of methods for driving the organic EL elements, i.e. cathode-line scanning and anode-line driving technique, and anode-line scanning and cathode-line driving technique. FIG. 3 shows the constitution for the cathode-line scanning and anode-line driving technique. The circuit of FIG. 3 comprises the cathode-line scanning circuit 51 connected to the cathode-lines $B_1$–$B_n$, and the anode-line driving circuit 52 with the power sources $52_1$–$52_m$ connected to the anode-lines $A_1$–$A_m$. The cathode-line scanning circuit 51 causes switches $53_1$–$53_n$ to switch to their ground terminal in order at regular time intervals to scan the cathode-lines $B_1$–$B_n$, so that ground potential (OV) is applied to the cathode-lines $B_1$–$B_n$ in order. The anode-line driving circuit 52 controls the switching of the switch $54_1$–$54_m$ in synchronization with the switch scanning of the cathode-line scanning circuit 51 to connect the power sources $52_1$–$52_m$ to the anode-lines $A_1$–$A_m$, so that a driving current flow is supplied to a desired light emitting element on a cross point.

The following description is made for explaining the light emission of the light emitting elements $E_{2,1}$–$E_{3,1}$. As shown in FIG. 3, when the switch 53, in the cathode-line scanning circuit 51 is switched to the ground terminal and the ground potential is applied to the first cathode-line $B_1$, the switches $54_2$ and $54_3$ in the anode-line driving circuit 52 is switched to the terminal connected to the power source, and the anode-lines $A_2$ and $A_3$ is then connected to the power sources $52_2$ and $52_3$, respectively, so that the light emitting elements $E_{2,1}$–$E_{3,1}$ can emit light. The rapid repetition of the scanning and driving described above causes the light emission of any given light emitting element, and the light emitting elements are controlled in the manner that they seems to simultaneously emit light.

In order to prevent erroneous light emissions of the remaining light emitting elements, an inverse bias voltage $V_{cc}$ which has the same magnitude as the voltage of the power source and the opposite polarity to that of the power source is applied to the cathode-lines $B_2$–$B_n$ except for the scanned cathode-line $B_1$. Although the circuit of FIG. 3 uses the current source $52_1$–$52_m$ as driving sources, it should be understood that voltage sources can be used as the driving sources.

The organic EL elements described above use a light emitting display function to constitute a display. Information signals are received into the display, by capturing image signals with a CCD camera, or capturing digital signals of an image drawn on a mapping board using a piezoelectric elements.

SUMMARY OF THE INVENTION

Described above, the conventional organic elements have been generally used as a light emitting display device, and have not been used as a device for capturing image data. Described below, however, the organic EL element has a characteristic for a photosensitive element, so that in combination with the light emitting display function, the organic EL element comes to provide a novel application which has not been achieved.

An object of the present invention is to provide a light emitting display apparatus which has a photosensitive reading function.

The present invention is characterized in that an organic electroluminescence display apparatus comprising: a plurality of organic EL elements arranged on a plane, driving means for driving said plurality of organic EL elements in response to an input signal to emit light from the organic EL elements, light input means for irradiating the organic EL elements with light, and reading means for reading out a voltage generated over the organic EL elements in response to a light input from said irradiating means.

Thus, the organic EL element can have two capabilities for the light emission and photosensitive memory storage, so that the organic EL element serves as a light emitting element and/or a memory, solely or in combination.

BRIEF DESCRIPTION OF THE DRAWINGS

The foregoing features and advantages of this invention will be better understood when the detailed description of a preferred embodiment provided below is considered in conjunction with the drawings provided, wherein.

DETAILED DESCRIPTION OF THE PREFERRED EMBODIMENTS

Figure 1:
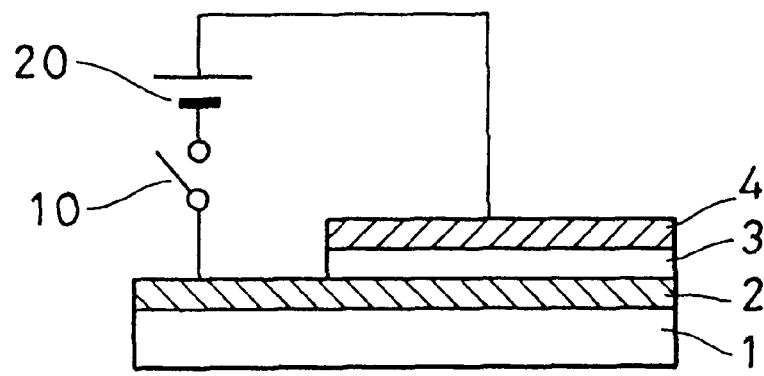
FIG. 1 is a diagram showing one embodiment of a conventional organic EL display device.
Figure 2:
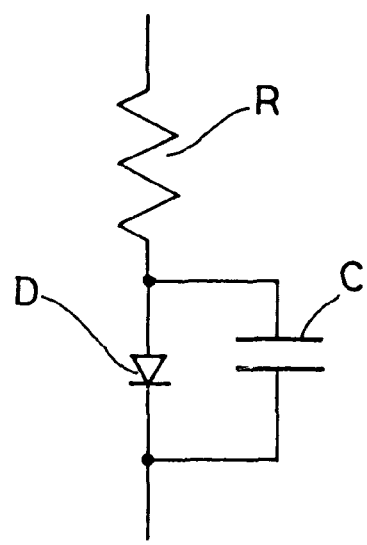
FIG. 2 is an electric equivalent circuit diagram of the conventional organic EL element.
Figure 3:
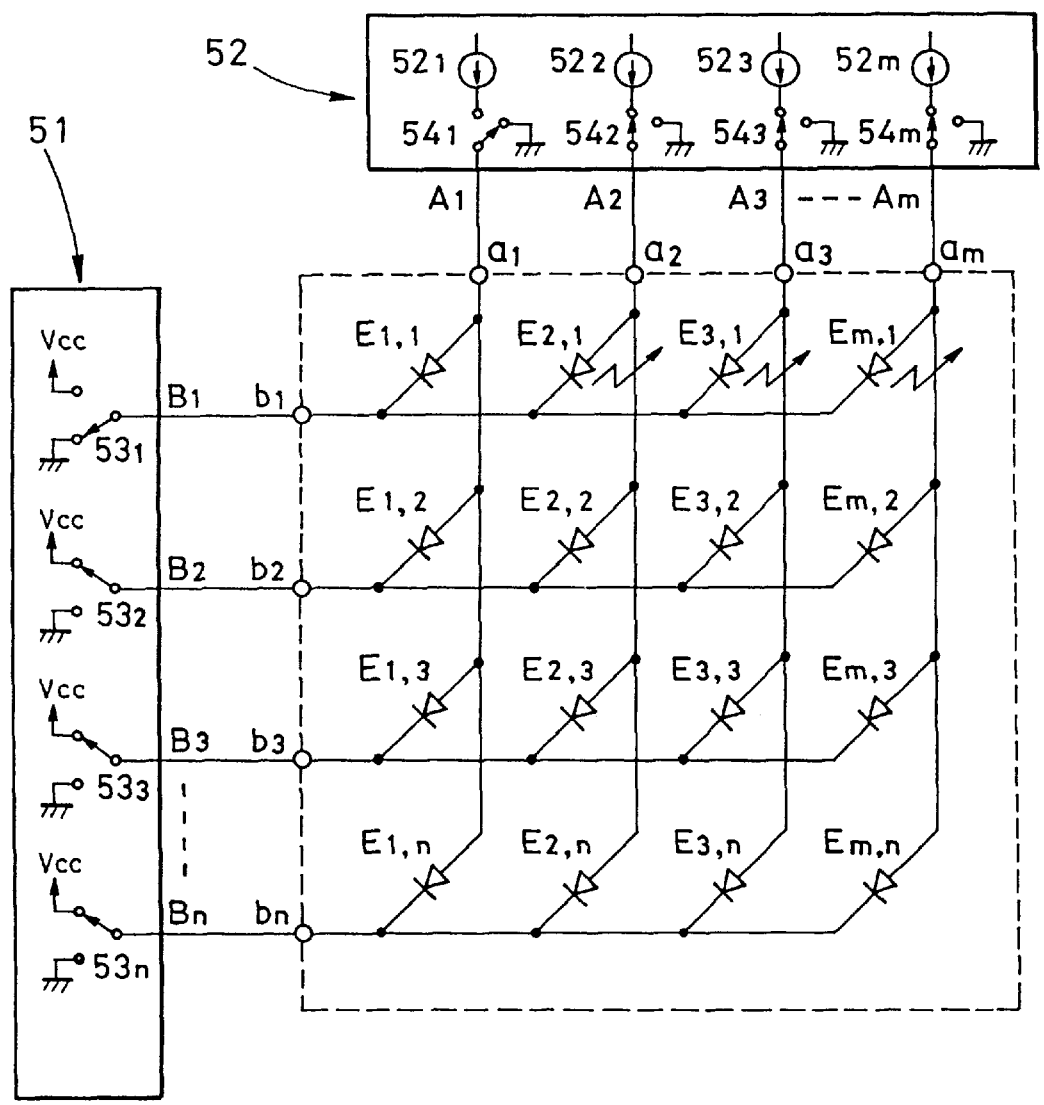
FIG. 3 is a diagram showing a conventional matrix-driving type of organic EL display device.
Figure 4:
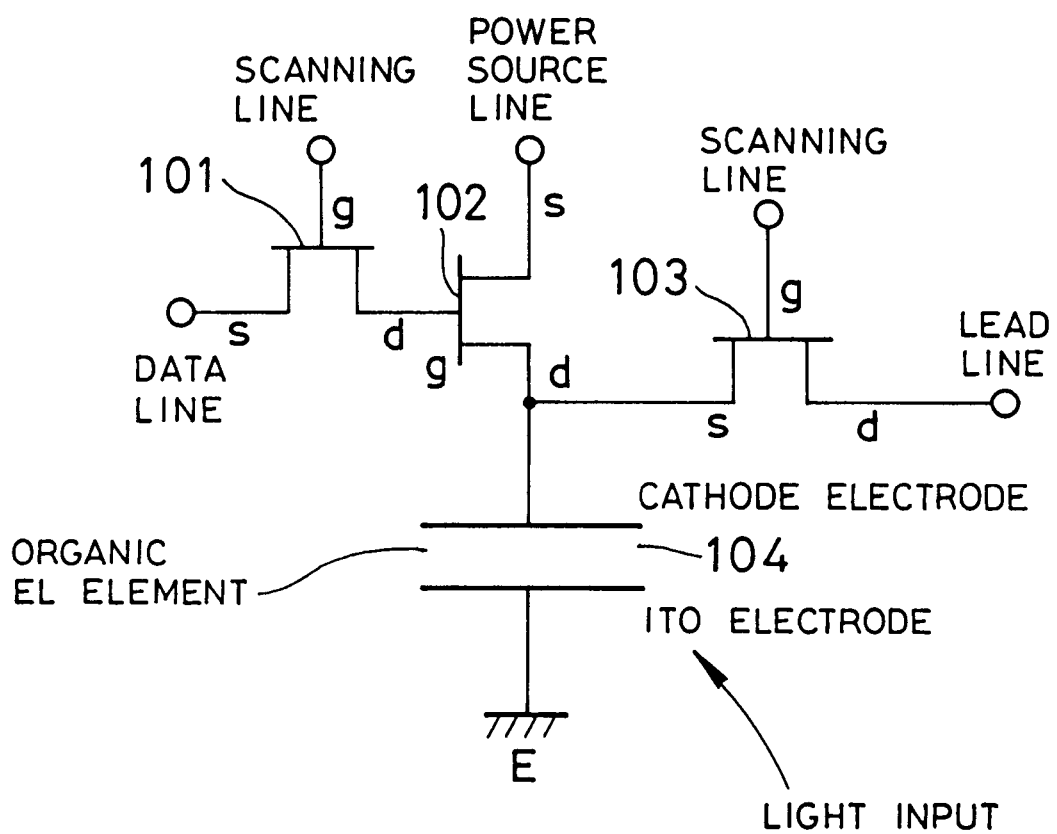
FIG. 4 is a diagram showing an organic EL element in a display reading apparatus according to the present invention.

FIG. 4 shows a schematic diagram of a display reading apparatus according to the present invention. In FIG. 4, numerals 101, 102, and 103 indicate FETs (field effect transistors), and a numeral 104 indicates an organic EL element. The organic EL element 104 has an anode electrode made of transparent conductive material such as ITO, which is connected to ground potential. The organic EL element 104 further has a cathode electrode connected to a drain electrode of the FET 102 and a source electrode of the FET 103.

The FET 101 has a source electrode connected to a data line, a drain electrode connected to a gate electrode of the FET 102, and a gate electrode connected to a scanning line. The FET 102 has a source electrode connected to a power source line which has a negative polarity. The FET 103 has a drain electrode connected to a lead line and a gate electrode connected to a scanning line. Driving pulses are applied to the corresponding scanning, data, and lead lines, respectively.

When the organic EL element is directed to emit light, a pulsed positive voltage from the scanning line is applied to the gate of the FET 101, and a pulsed positive voltage from the data line is applied to the source of the FET 101, so that the gate electrode is opened. A current flows to the cathode electrode of the organic EL element from the power source line to which a negative driving voltage has been previously applied. This current causes the EL element to emit light. Even if the vanishment of a pulse from the scanning line turns the FET 101 off, the electric charge stored on the gate of the FET 102 keeps the gate of the FET 102 open. The current then continues flowing through the organic EL element, so that the light emission is sustained till the next scanning pulse is applied.

In order to cease the emission of the organic EL element, a negative pulsed voltage from the data line is applied to the FET 101 to drain the positive charge of the FET 101 from the gate of the FET 101 on applying a scanning pulse to the FET 101, so that the current flowing through the organic EL element is stopped. The above operation of the organic EL element determines brightness levels of the emission as a function of the scanning cycles. On the other hand, in the case of optical writing to the organic EL element, the irradiation of the organic EL element with the light causes the organic EL element to generate a voltage of the range of 1.5–2 V, which arises on the cathode electrode of the EL element. If a scanning pulse is applied to the gate of the FET 103, the voltage on the cathode electrode can be read out. In the case of the reading, a threshold voltage is provided to determine whether an output voltage from the EL element corresponds to the light emission of the Elements. The voltage from the EL element is then stored in a frame memory, and is summed up every frame memory to obtain data for the optical writing. The optical writing data is displayed with the display data being overlapped thereon, by adding the data in the frame memory to the display data and then transferring the added data to a display panel.

Figure 5A:
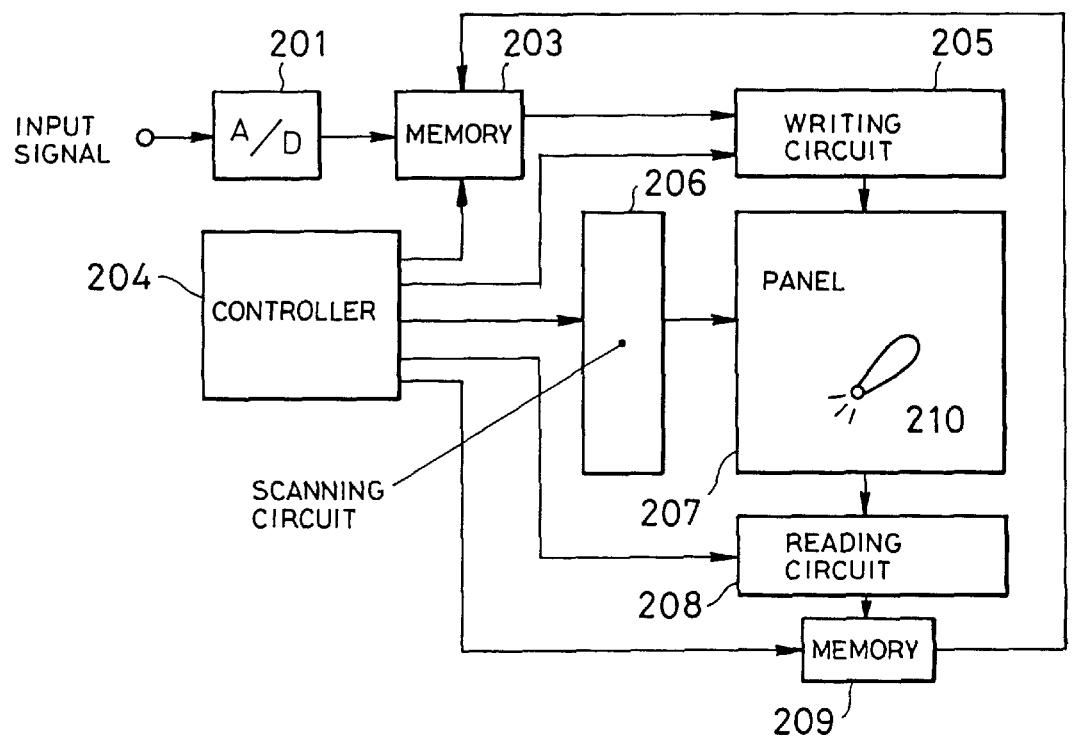
FIG. 5A is a diagram of the whole of an input device according to the present invention.
Figure 5B:
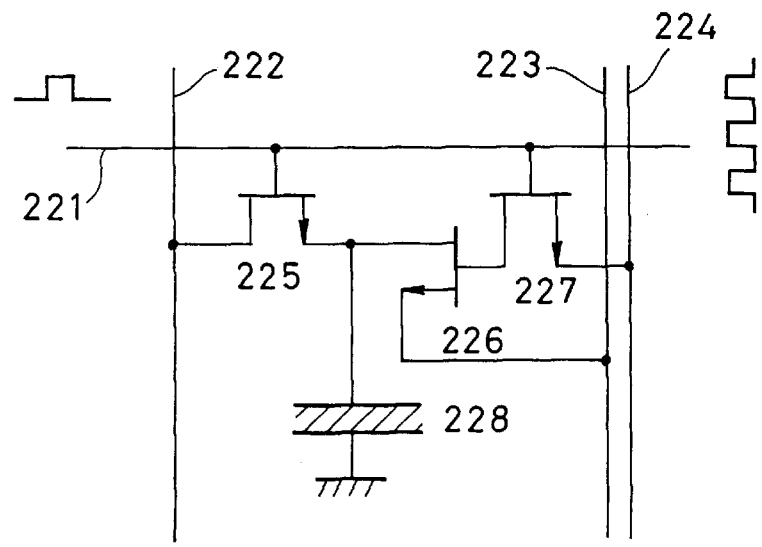
FIG. 5B is a diagram showing an organic EL element according to the present invention.

FIGS. 5A and 5B show a display panel comprising a plurality of organic EL elements arranged in a matrix and driving circuits, wherein the configuration shown in FIG. 4 consists of a unit cell. FIG. 5A shows a diagram of the whole of the panel, and FIG. 5B is a diagram showing single organic EL element which constitutes the panel 207. Referring to FIG. 5A, an input signal for the display on the panel 207 is supplied to an A/D (analog-digital) convertor 201 from a video reproducing apparatus (not shown) to be stored in a frame memory 203.

The data stored in the frame memory 203 is transferred to a writing circuit 205, which then supplies the transferred data as a driving pulse to data lines in the panel 207 including the organic EL elements in the matrix. On the other hand, a controller 204 controls a scanning circuit 206 to drive each of scanning lines in the panel 207. As a result, the scanning and writing circuits causes each of the organic EL element in the panel to emit light in accordance with the input signal.

The scanning circuit 206 then scans a voltage on each of the lead lines, so that a reading circuit 208 can read out data from the lead line the read data is summed up in a memory 209 to be stored therein. The data stored in the memory 209 is summed up in a memory 203 to be stored therein. The controller 204 performs the above data sequence. The read data can achieve a voltage of about −5V in the organic EL element during the light emitting display period, a voltage of about −2V in the organic EL element which is irradiated by a light pen 210, or a voltage of 0V in the remaining organic EL elements. Thus, a voltage induced by the light reception appears with the gate voltage overlaid thereon. In case where a comparator circuit is provided in the reading circuit, all of the organic EL elements in the panel can be classified into three groups, i.e. one group of the EL elements which emit light, a second group of the EL elements which is irradiated with incoming light, and a third group of the remaining of the EL elements, to read them out separately.

Furthermore, in the memory 203, in addition to the input signals, the data which has been picked up by the reading circuit 208 is summed up through the memory 209. Thus, the memory 203 stores the data for causing the organic EL elements to emit light in accordance with the input signal, and the data which has been generated by the light from the light pen 210 to be read out by the reading circuit 208. The data stored in the memory 203 is used to control the light emission of the panel 207 using the writing circuit 205. In other words, the image drawn by using the light pen 210 is overlapped on the display image based on the input signals, to display on the panel. It should be understood that the controller 204 can select only one image on the panel to display the image based on the input signals.

Referring to FIG. 5B, an organic EL element 228 has an anode electrode connected to the ground and a cathode electrode connected to a source electrode of a FET 225 and a drain electrode of a FET 226. The FET 225 further has a drain electrode connected to a lead line 222 and a gate electrode connected to a scanning line 221. The FET 226 has a source electrode connected to a power source line 223 and a gate electrode connected to a drain electrode of a FET 227. The FET 227 further has a source electrode connected to a data line 224. The configuration described above constitutes a unit cell for the panel. Thus, it is the panel 207 shown in FIG. 5A that comprises a desired number of unit cells arranged in the predetermined manner.

In the operation of the organic EL elements, when positive pulses are applied to the data line 224 and the scanning line 221, respectively, the FET 227 is turned ON, so that positive charge is supplied to the gate electrode of the FET 226. The FET 226 then functions to cause a current to flow from the ground potential through the organic EL element 228 to the negative power source line 223. Even if the application of the positive pulse to the FET 227 is terminated, while any charge remains on the gate electrode of the FET 227, the FET 226 causes the driving current to flow through the organic EL element 228. With respect to an actual light emitting display, multiple brightness levels of the EL element can be realized by varying the repetition number of pulses applied to the data line 224 and the scanning line 221. In the embodiments shown in FIGS. 4, 5A, and 5B, single organic EL element consists of a unit pixel for the display. However, in the case of color display, it is noted that at least three of organic EL elements, each of which corresponds to red (R), blue (B), and green (G) colors respectively, may consist of single unit pixel.

The following description is made for explaining the operation for the ceasing the light emission. When a positive pulse is applied over the scanning line 221, the application of a negative pulse to the data line 224 causes the FET 226 to discharge the electric charge on the gate electrode through the FET 227 to the data line 224, so that the current flow across the organic EL element is vanished to cease the light emission.

In the operation for reading the organic EL element shown in FIG. 5B, the application of a positive pulse to the scanning line 221 causes the gate of the PET 225 to be applied with the positive pulse, so that the FET 225 is turned on. The cathode voltage added on the gate voltage then appears on the lead line 222. Accordingly, the data in the organic EL element can be read out by deriving the potential level of the lead line 222 to an external circuit. The present invention characterizes the configuration including organic EL elements, a driving circuit, and a reading circuit, rather than the method for constituting the driving circuit.

An apparatus of the present invention can perform not only data processing of a trace drawn by a light pen, but also the d lay of the image trace which is drawn by the light pen and overlapped on an image which has been previously drawn over the organic EL panel 207.

In addition, by using the apparatus of the invention, it is possible to determine whether a light pen irradiate a programmed drawing, such as an icon for a computer, on an organic EL panel.

The above description has described the preferred embodiments of the present invention. The following description is made for explaining basic characteristics of an organic EL element, in particular, charge absorption characteristics of an organic EL element.

Organic EL elements used in the following experiences comprises various kinds of layers deposited vertically in order, i.e. CuPc/NPABP/Alq3+DCJT/Alq3/LiO/Al, and each of the layer has the thickness of 0.18 $\mu$m. The organic EL element has a light emitting area of 2 mm×2 mm. Two terminals of the organic EL element are shortcircuited. Till the current through the organic EL element is equal or below 1 pA, the shortcircuit of the terminals is then maintained (e.g. for five minutes), so that electric charge in the organic EL element is reduced.

Figure 6A:
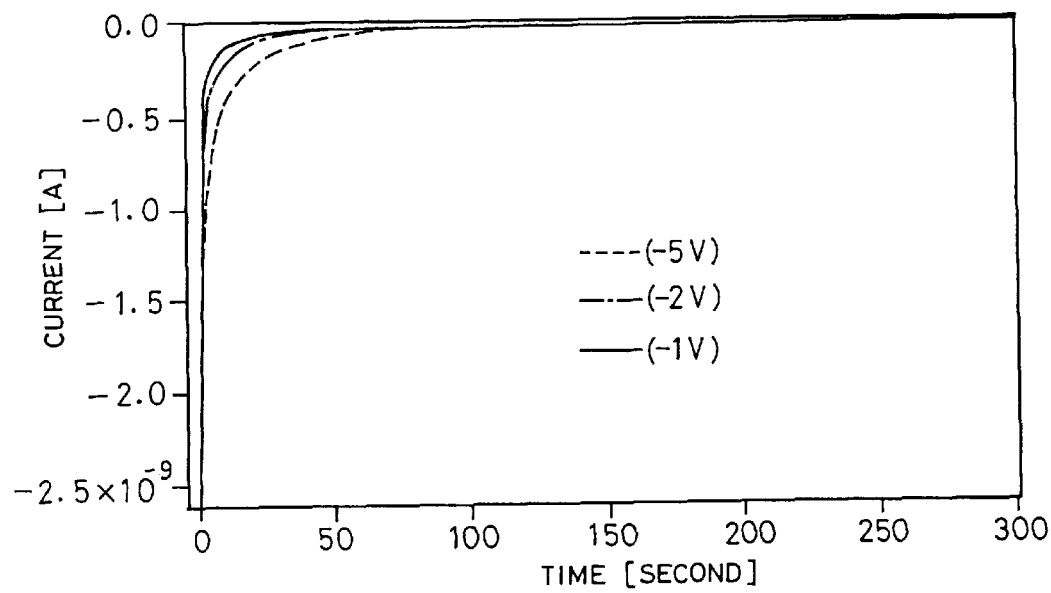
FIGS. 6A and 6B are views indicating the electric characteristics of an organic EL element of the invention.
Figure 6B:
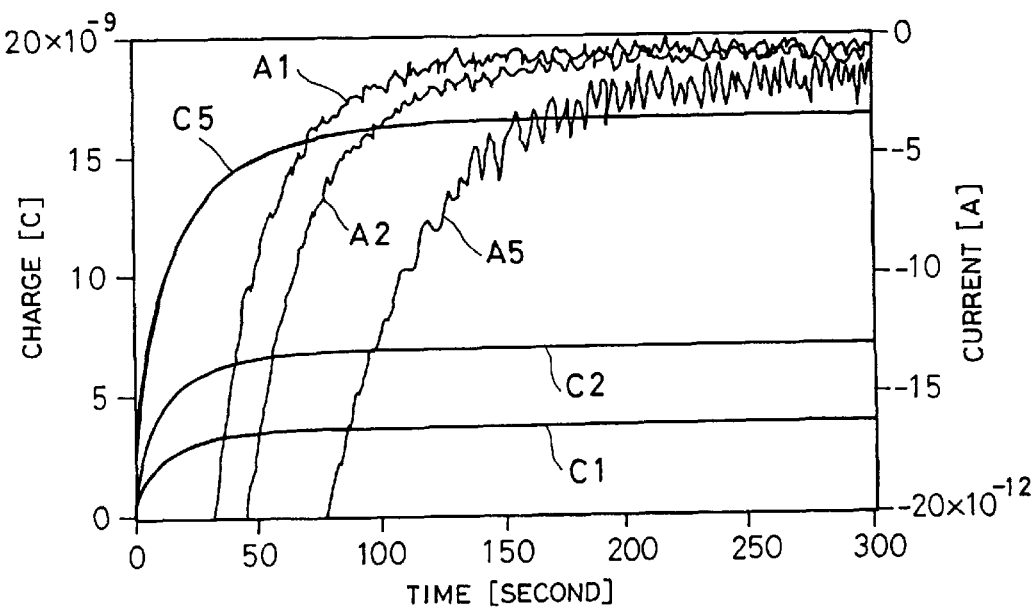

Next, when a predetermined voltage is applied between the terminals to continue the application of the voltage, a large amount of current initially flow through the organic EL element, and the amount of the current is gradually reduced to achieve a state of equilibrium. The amount of charge pumped into the organic EL element is calculated, by subtracting the equilibrium current from the current achieved during the above measurement, and time-integrating the resultant current. FIGS. 6A and 6B show the relationships between the current of the organic EL element and time. FIG. 6A has a longitudinal axis indicative of the current level. The longitudinal axis indicates negative values, so that it is found that a current exits from the organic EL element. FIG. 6B is a partial enlarged view of FIG. 6A, wherein A is the actual amount of the current of the organic EL element, C is a calculated amount of the current, and numerals 1, 2, and 5 represent applied negative voltages, respectively. For example, a curved line A1 in FIG. 6B represents the current characteristic to the applied voltage of −1V. It is concluded that the organic EL element is able to absorb the amount of charge proportional to the voltage.

The following description is made for explaining an electric charge injection to the organic EL element with white light.

Figure 7A:
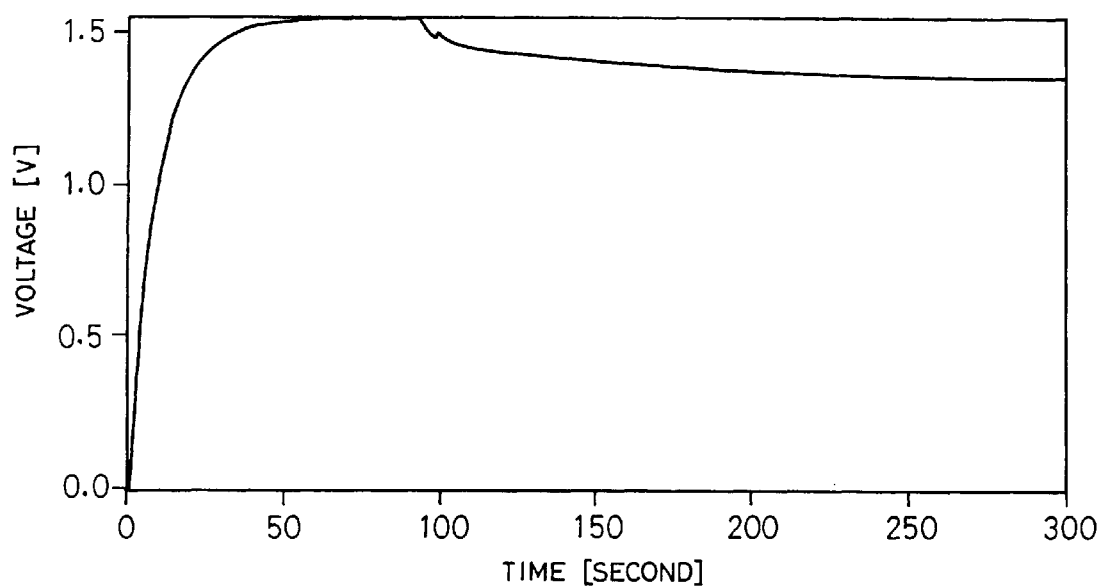
FIGS. 7A and 7B are views indicating the electric characteristics of another organic EL element of the invention.

FIG. 7A shows the variation in the voltage generated in the organic EL element with its terminals being released when white light having a brightness of substantially 1,000 cd/m$^2$ (1.6 mW/cm$^2$) irradiates the organic EL element. FIG. 7A shows the variation caused due to the above operation. FIG. 7A shows the variation in the terminal voltage, in the case where the irradiation of the white light starts and is then stopped after the period of 90 seconds is elapsed.

As a result, a voltage of 1.56V arises between the terminals of the organic EL element by the irradiation of the white light of substantially 1,000 cd/m$^2$. Then, when the white light then is blocked, it is found that the voltage drop equals to about 0.2 V during the period of 200 seconds. This means that the organic EL element has both of photosensitivity and memory storage capability.

Figure 7B:
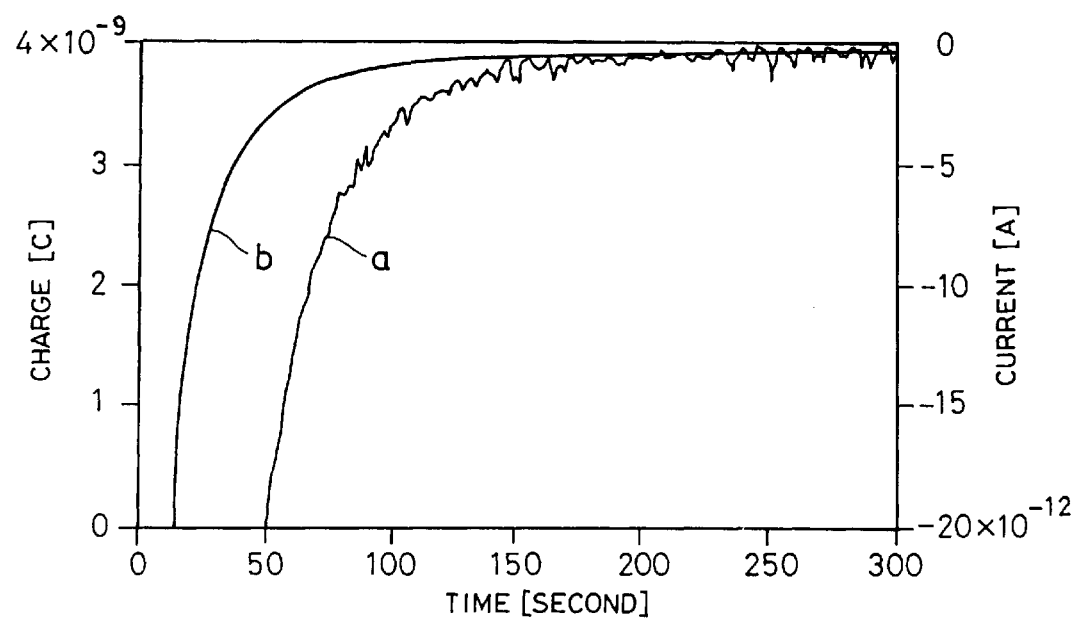

A curved line "a" in FIG. 7B represents the change in the current flowing through the organic EL element irradiated by the white light with its terminals being shortcircuited. A curved line "b" in FIG. 7B indicates the change in the amount of the electric charge exiting from the organic EL element, which is obtained by the integration of the above change in the current.

Figure 8:
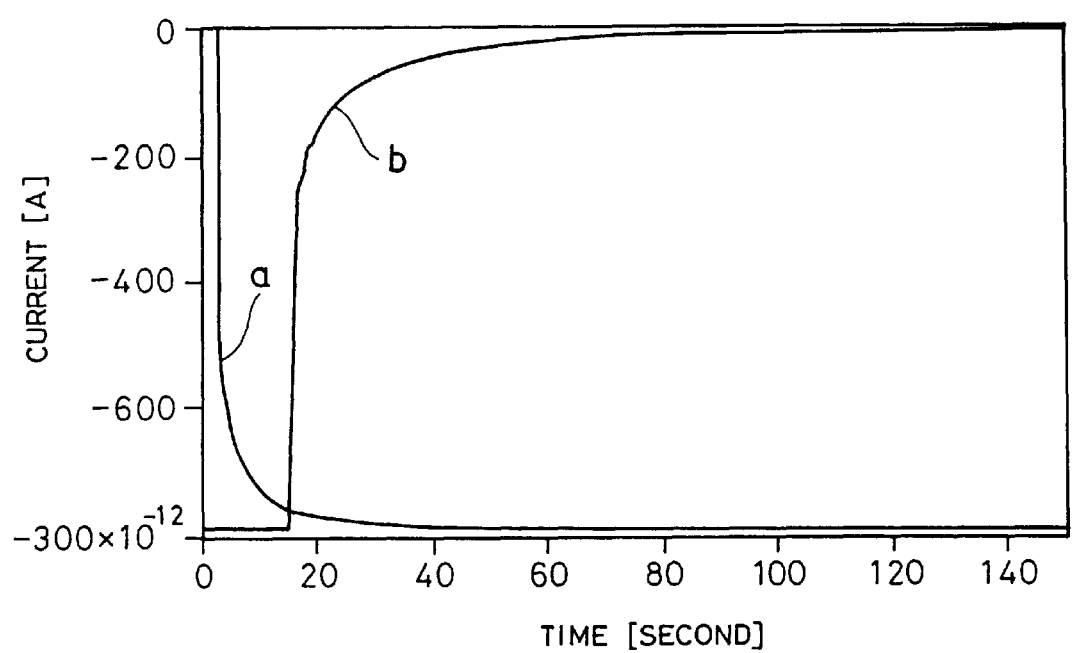
FIG. 8 is view indicating the electric characteristics of further organic EL element of the invention.

FIG. 8 shows the current characteristic of the organic EL element, wherein a curved line "a" indicates the variation of the current flowing through the EL element irradiated by the white light with its terminals being shortcircuited, a curved line "b" indicates the variation of the current flowing through the EL element with its terminals being shortcircuited after the irradiation of the white light is ceased.

Described above, it is understood that the irradiation of the organic EL element by the light produces electric charge within the organic EL element, the organic EL element holds the produced electric charge, and if necessary, the EL element can discharge the electric charge externally. This means that the organic EL element has photosensitivity and memory storage capability. Accordingly, by utilizing these characteristics, a only single unit cell of the above organic EL element can constitute a display panel which has more complex functions, such as optical writing capability, reading and transferring capability of the written image, and light emitting display capability than a conventional display panel.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An organic EL display apparatus for displaying an image thereon, said apparatus comprising:

a plurality of organic EL elements arranged in a matrix form on a plane, each one of said organic EL elements including a pair of electrodes and an EL layer provided between said pair of electrodes and being able to emit light in response to an image signal supplied thereto, said EL layer generating a photoelectric voltage thereacross in response to an incident light thereon;

driving means for successively driving selected ones of said organic EL element by successively supplying drive currents across said electrodes of the selected one of said EL elements in response to an image signal supplied to said apparatus; and signal generating means for generating an electric signal while detecting in sequence the photoelectric voltages each appearing across said electrodes of either ones of said organic EL elements.

2. An organic EL display apparatus according to claim 1, in which said driving means includes a plurality of drive-signal supply switch-circuits respectively corresponding to said EL elements each for supplying said drive current to the corresponding EL element in response to said image signal.

3. An organic EL display apparatus according to claim 2 in which said drive-signal supply switch-circuits includes common scan lines (221) each corresponding to a row of said EL elements, common data lines (224) intersecting said scan lines and each corresponding to a column of said EL elements, and an ON-OFF switch circuit (226, 227) for supplying said drive current to said EL elements (228) in response to voltages appearing across each of intersections between said common scan lines and said common data lines.

4. An organic EL display apparatus according to claim 3, in which said signal generating means includes a plurality of common read lines (222) intersecting said common scan lines and each corresponding to said row of the EL elements, a plurality of signal generating switch-circuits (225) each relaying said photoelectric voltage appearing across one of said EL elements positioned at an intersection between said common read lines and said scan lines, comparing means for comparing the relayed ones of said photoelectric voltage with at least one threshold voltage, and successively producing output voltages when said relayed ones exceeds said threshold voltage, and means for memorizing and summing said output voltages to one another so as to generate said electric signal.

5. An organic EL display apparatus according to claim 1, which further comprises:

control means for superposing said electric signal onto said image signal.

6. An organic EL display apparatus according to claim 1, which further comprises:

light irradiating means for scanning said EL elements with a light beam.

* * * * *